United States Patent
Fukumori et al.

(10) Patent No.: US 7,728,064 B2
(45) Date of Patent: Jun. 1, 2010

(54) AQUEOUS LIQUID DISPERSION OF WATER AND OIL REPELLENT AGENT CONTAINING NONIONIC SURFACTANT

(75) Inventors: Masaki Fukumori, Osaka (JP); Tsukasa Aga, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 398 days.

(21) Appl. No.: 10/579,217

(22) PCT Filed: Nov. 4, 2004

(86) PCT No.: PCT/JP2004/016318

§ 371 (c)(1),
(2), (4) Date: May 12, 2006

(87) PCT Pub. No.: WO2005/047416

PCT Pub. Date: May 26, 2005

(65) Prior Publication Data

US 2007/0135559 A1    Jun. 14, 2007

(30) Foreign Application Priority Data

Nov. 13, 2003    (JP) .............................. 2003-383500

(51) Int. Cl.
*C09K 3/18* (2006.01)
*C08F 2/30* (2006.01)

(52) U.S. Cl. ................. 524/544; 524/376; 524/556; 526/209; 526/212; 526/245

(58) Field of Classification Search .................. None
See application file for complete search history.

(56) References Cited

U.S. PATENT DOCUMENTS

2002/0173585 A1* 11/2002 Funaki et al. .............. 524/544
2003/0130457 A1* 7/2003 Maekawa et al. .......... 526/242
2004/0087695 A1* 5/2004 Sugimoto et al. .......... 524/386

FOREIGN PATENT DOCUMENTS

| EP | 1 365 000 A1 | 11/2003 |
| EP | 1 394 232 A1 | 3/2004 |
| JP | 53-4159 | 2/1978 |
| JP | 2001-107031 | 4/2001 |
| JP | 2001-107301 A | 4/2001 |
| JP | 2002-220539 A | 8/2002 |
| WO | WO 02/064696 A1 | 8/2002 |
| WO | WO 02/088272 A1 | 11/2002 |

OTHER PUBLICATIONS

Machine Translation of JP 2001-107031 A.*
English Translation of JP 2001-107031 A.*

* cited by examiner

*Primary Examiner*—David Wu
*Assistant Examiner*—Vu Nguyen
(74) *Attorney, Agent, or Firm*—Sughrue Mion, PLLC

(57) ABSTRACT

Disclosed is an aqueous liquid dispersion of water and oil repellent agent containing surfactants wherein there are contained (I) a homopolymer or copolymer of at least one polymerizable compound having a perfluoroalkyl or perfluoroalkenyl group and an acrylate, methacrylate or alpha-substituted acrylate group, or a copolymer of such a polymerizable compound with another copolymerizable compound which is copolymerizable with such a polymerizable compound, and (II) three nonionic surfactants, namely (a) a nonionic surfactant having an HLB of less than 12, (b) a nonionic surfactant having an HLB of not less than 12 and less than 17, and (c) a nonionic surfactant having an HLB of not less than 17. Such an aqueous liquid dispersion of a water and oil repellent agent containing surfactants is excellent in shelf life stability and dilution stability, and provides high water and oil repellency to an object.

7 Claims, No Drawings

AQUEOUS LIQUID DISPERSION OF WATER AND OIL REPELLENT AGENT CONTAINING NONIONIC SURFACTANT

TECHNICAL FIELD

The present invention relates to an aqueous water- and oil-repellent dispersion, and particularly relates to an aqueous water- and oil-repellent dispersion containing three different nonionic surfactants.

BACKGROUND ARTS

It is known that a polymer prepared from a polymerizable compound having a perfluoroalkyl or perfluoroalkenyl group and an acrylate or methacrylate group is useful as a water- and oil-repellent agent used for a textile and woven fabric. Particularly an aqueous dispersion wherein said polymer is dispersed in an aqueous medium with a surfactant is industrially and widely used.

Generally, emulsion particles have the ionicity caused by a surfactant obtained by combining a cationic or anionic surfactant with a nonionic surfactant for the purpose of giving a stable dispersion. In this case, there is the problem that the properties are rapidly worsened in a latter half of treatment by selective absorption of particles to a woven fabric, and in the case of using different ionic agents for a treatment liquid, there is the problem that a dispersion liquid is broken to generate agglomerated cakes of polymer which troublously makes stains of the processed fabric by attachment of agglomerated cakes to the processed fabric.

In order to solve above problems, JP-B-53-4159 proposes that a nonionic surfactant having an HLB of 15 to 20 and is used in aqueous medium in an amount of at least 40% by weight. However, a storage stability and a stability at dilution use are remarkably poor, and performances (particularly water- and oil-repellency) also are poor.

DISCLOSURE OF THE INVENTION

Problems to be Solved by the Invention

An object of the present invention is to provide a water- and oil-repellent dispersion which can impart excellent water- and oil-repellency and which has excellent storage stability and dilution stability.

Means for Solving Problems

The present invention relates to an aqueous water- and oil-repellent dispersion comprising:
(I) a homopolymer or copolymer comprising at least one polymerizable compound having a perfluoroalkyl or perfluoroalkenyl group and an acrylate, methacrylate or alpha-substituted acrylate group, or
  a copolymer comprising said polymerizable compound and another compound copolymerizable therewith, and
(II) a surfactant comprising:
  (a) a nonionic surfactant having an HLB of less than 12, (b) a nonionic surfactant having an HLB of not less than 12 and less than 17, and (c) a nonionic surfactant having an HLB of not less than 17.

Effect of the Invention

The emulsion polymerization comprising the use of three nonionic surfactants having different HLB values gives an aqueous water- and oil-repellent dispersion liquid which is excellent in a product stability and a dilution stability, which has excellent stability even if an ionic agent is used in combination, and which imparts high water and oil repellency.

BEST MODE FOR CARRYING OUT THE INVENTION

The aqueous water- and oil-repellent dispersion of the present invention comprises the polymer (I) and the surfactant (II).

[Polymer (I)]

The polymer (I) is a polymer which comprises a polymerizable compound (that is, a fluorine-containing polymerizable compound) having a perfluoroalkyl or perfluoroalkenyl group and an acrylate, methacrylate or alpha-substituted acrylate group, and optionally present another polymerizable compound.

Examples of the fluorine-containing polymerizable compound include (meth)acrylates represented by the formulas:

[Chemical formula 1]

(1)

(2)

(3)

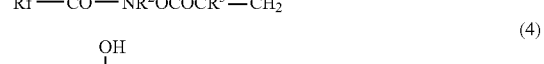

(4)

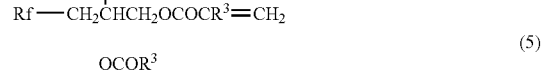

(5)

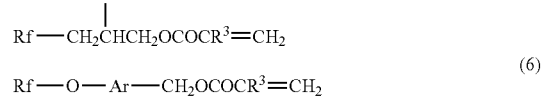

(6)

wherein Rf is a perfluoroalkyl group or perfluoroalkenyl group having 1 to 21 carbon atoms, $R^1$ is hydrogen or an alkyl group having 1 to 10 carbon atoms, $R^2$ is an alkylene group having 1 to 10 carbon atoms, $R^3$ is a hydrogen atom, a methyl group, a fluorine atom, a chlorine atom, a bromine atom, an iodine atom, a $CFX^1X^2$ group (provided that $X^1$ and $X^2$ are a hydrogen atom, a fluorine atom, a chlorine atom, a bromine atom or an iodine atom.), a cyano group, a linear or branched fluoroalkyl group having 1 to 21 carbon atoms, a substituted or unsubstituted benzyl group, or a substituted or unsubstituted phenyl group, Ar is an aryl group which may have a substituent group, and n is an integer of 1 to 10.

In the above formulas, the Rf group is preferably a perfluoroalkyl group. The carbon number of the Rf group is from 1 to 21, particularly from 2 to 20, especially from 4 to 16, for example, from 6 to 14. Alternatively, the carbon number of the Rf group may be from 1 to 6, particularly from 1 to 4. Examples of the Rf group include $-CF_3$, $-CF_2CF_3$, $-CF_2CF_2CF_3$, $-CF(CF_3)_2$, $-CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $-CF(CF_3)CF_2CF_2CF_3$, $-(CF_2)_5CF_3$, —$(CF_2)_3CF(CF_3)_2$, —$(CF_2)_4CF(CF_3)_2$, —$(CF_2)_7CF_3$, —$(CF_2)_5CF(CF_3)_2$, —$(CF_2)_6CF(CF_3)_2$ and —$(CF_2)_9CF_3$.

Specific examples of the fluorine-containing polymerizable compound having an acrylate or methacrylate group are as follows:

$CF_3(CF_2)_7(CH_2)OCOCH=CH_2$, $CF_3(CF_2)_6(CH_2)OCOC(CH_3)=CH_2$, $(CF_3)_2CF(CF_2)_6(CH_2)_2OCOCH=CH_2$, $CF_3(CF_2)_7(CH_2)_2OCOC(CH_3)=CH_2$, $CF_3(CF_2)_7(CH_2)_2OCOCH=CH_2$, $CF_3CF_2(CH_2)_2OCOCH=CH_2$, $CF_3(CF_2)_3(CH_2)_2OCOCH=CH_2$, $CF_3(CF_2)_7SO_2N(CH_3)(CH_2)_2OCOCH=CH_2$, $CF_3(CF_2)_7SO_2N(C_2H_5)(CH_2)_2OCOC(CH_3)=CH_2$, $(CF_3)_2CF(CF_2)_6CH_2CH(OCOCH_3)CH_2OCOC(CH_3)=CH_2$, $(CF_3)_2CF(CF_2)_6CH_2CH(OH)CH_2OCOCH=CH_2$,

[Chemical formula 2]

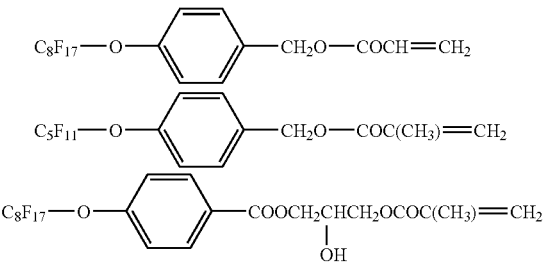

[Chemical formula 3]

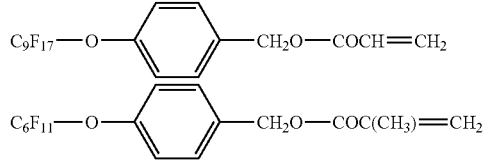

In the alpha-substituted acrylate group, examples of the alpha-substituent are a halogen atom (for example, a fluorine atom, a chlorine atom, a bromine atom or a iodine atom), an alkyl group (for example, having 1 to 21 carbon atoms) wherein a hydrogen atom is substituted with a halogen atom (for example, a monofluoromethyl group or difluoromethyl group), a cyano group, an aromatic group (for example, a substituted or unsubstituted benzyl group, and a substituted or unsubstituted phenyl group).

Examples of the fluorine-containing polymerizable compound having the alpha-substituted acrylate group are as follows:

[Chemical formula 4]

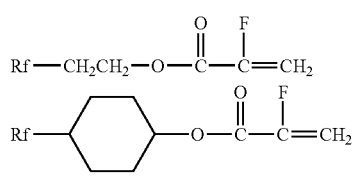

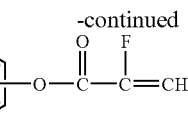

[Chemical formula 5]

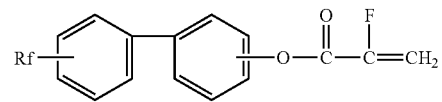

[Chemical formula 6]

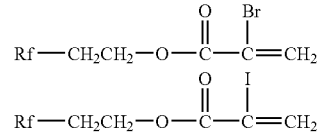

[Chemical formula 7]

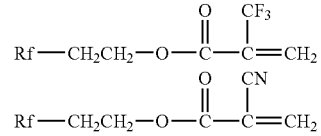

[Chemical formula 8]

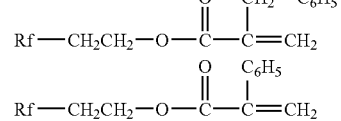

[Chemical formula 9]

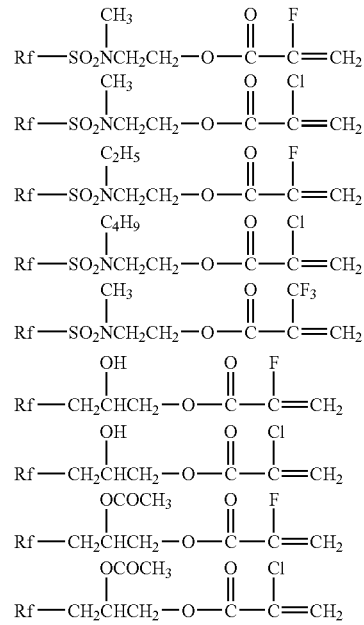

wherein Rf is a linear or branched perfluoroalkyl or perfluoroalkenyl group having 1 to 21 carbon atoms.

The other copolymerizable compound may be various. Examples of the other copolymerizable compound include:

(1) acrylic acid and methacrylic acid, and methyl, ethyl, butyl, isobutyl, t-butyl, propyl, 2-ethylhexyl, hexyl, decyl, lauryl, stearyl, isobornyl, β-hydroxyethyl, glycidyl, phenyl, benzyl and 4-cyanophenyl esters thereof;

(2) vinyl esters of fatty acids such as acetic acid, propionic acid, caprylic acid, lauric acid and stearic acid;

(3) styrene compounds such as styrene, α-methylstyrene and p-methylstyrene;

(4) vinyl and vinylidene halide compounds such as vinyl fluoride, vinyl chloride, vinyl bromide, vinylidene fluoride and vinylidene chloride;

(5) fatty acid allyl esters such as allyl heptanoate, allyl caprylate and allyl caproate;

(6) vinyl alkyl ketones such as vinyl methyl ketone and vinyl ethyl ketone;

(7) acryl amides such as N-methylacrylamide and N-methylolmethacrylamide; and (8) dienes such as 2,3-dichloro-1,3-butadiene and isoprene.

A chlorine-containing polymerizable compound (for example, vinyl chloride and vinylidene chloride) (for example, in the amount of 1 to 50% by weight, particularly 5 to 30% by weight, based on the polymer) is preferably contained as the other polymerizable compound.

The amount of the fluorine-containing polymerizable compound may be at least 30% by weight, for example, from 40 to 90% by weight, particularly from 50 to 80% by weight, based on the polymer (I).

The weight-average molecular weight of the polymer (I) may be from 5,000 to 2,000,000, for example, from 10,000 to 500,000 (in terms of polystyrene), as measured by a gel permeation chromatography (GPC).

[Surfactant (II)]

In the present invention, the surfactant (II) is used for the purpose of intimately dispersing the fluorine-containing polymer into the aqueous dispersion liquid. The surfactant (II) comprises three nonionic surfactants having different HLB values. The surfactant (II) may contain an ionic surfactant (for example, cationic, anionic or amphoteric) in addition to the nonionic surfactant. Preferably, the surfactant (II) consists of the nonionic surfactant. The surfactant (II) may be present at the polymerization of the fluorine-containing polymer (I), or may be added after the polymerization. Preferably, the surfactant (II) is present at the polymerization.

Specific examples of the nonionic surfactant used in the present invention include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene monolaurate, polyoxyethylene monostearate, polyoxyethylene mono-oleate, sorbitan monolaurate, sorbitan monostearate, sorbitan monopalmitate, sorbitan monostearate, sorbitan mono-oleate, sorbitan sesqui-oleate, sorbitan trioleate, polyoxyethylene sorbitan monolaurate, polyoxyethylene sorbitan monopalmitate, polyoxyethylene sorbitan monostearate, polyoxyethylene sorbitan mono-oleate, polyoxyethylene polyoxypropylene block polymer, polyglycerin fatty acid ester, polyether-modified silicone oil (SH3746, SH3748, SH3749 and SH3771 manufactured by Toray Dow Corning Silicone Co., Ltd.), perfluoroalkyl ethylene oxide adduct (UNIDYNE DS-401 and DS-403 manufactured by Daikin Industries, Ltd.), fluoroalkyl ethylene oxide adduct (UNIDYNE DS-406 manufactured by Daikin Industries, Ltd.), and perfluoroalkyl oligomer (UNIDYNE DS-451 manufactured by Daikin Industries, Ltd.).

Examples of the commercially available product of the nonionic surfactant includes polyoxyethylene oleyl ether (trade name: EMULGEN 430, manufactured by Kao Corporation), polyoxyethylene lauryl ether (trade name: NIKKOL BL-21, manufactured by Nikko Chemicals Co., Ltd.).

Three nonionic surfactants: (a) a nonionic surfactant having an HLB of less than 12, (b) a nonionic surfactant having an HLB of not less than 12 and less than 17, and (c) a nonionic surfactant having an HLB of not less than 17, are used.

In the present invention, as the HLB value, adopted is a value shown in a brochure when the brochure shows the HLB value, and is a measured value (measured according to W. G. Griffin, J. Soc. Cosmetic Chemists, 1, 311 (1949) and W. G. Griffin, J. Soc. Cosmetic Chemists, 5, 249 (1954)) when brochures do not show an HLB value.

Examples of the nonionic surfactant (a) having an HLB of less than 12 includes the followings:

$C_{11-14}H_{23-29}$-iso-$O(C_2H_4O)_3H$ (HLB value:8.0) (NONION EAD-8 manufactured by NOF Corp.)

$C_{12}H_{25}O(C_2H_4O)_4H$ (HLB value:9.2) (NONION K-204 manufactured by NOF Corp.) sorbitan monopalmitate (HLB value:6.7) (NONION PP-40R manufactured by NOF Corp.).

The nonionic surfactant (b) having an HLB of not less than 12 and less than 17 include the followings:

$C_{11-14}H_{23-29}$-iso-$O$—$(C_3H_6O)_3(C_2H_4O)_{20}H$ (HLB value:14.0)(NONION EBD-14 manufactured by NOF Corp.)

$C_{12}H_{25}O(C_2H_4O)_{20}H$ (HLB value:16.2) (NONION K-220 manufactured by NOF Corp.) polyoxyethylene(21 mol)sorbitan monooleate (HLB value:15.0) (NONION OT-221 manufactured by NOF Corp.).

The nonionic surfactant (c) having an HLB of not less than 17 includes the followings:

$C_{12}H_{25}O(C_2H_4O)_{30}H$ (HLB value:17.3) (NONION K-230 manufactured by NOF Corp.)

[Chemical formula 10]

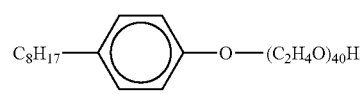

(HLB value:17.9) (NONION HS-240 manufactured by NOF Corp.)

[Chemical formula 11]

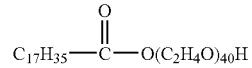

(HLB value:18.2) (NONION S-40 manufactured by NOF Corp.).

The amount of the surfactant (II) may be from 1 to 30 parts by weight, particularly from 5 to 20 parts by weight, based on 100 parts by weight of the fluorine-containing polymer (I). When the nonionic surfactant is combined with the ionic surfactant, the amount of the ionic surfactant may be at most 15 parts by weight, particularly 10 parts by weight, based on 100 parts by weight of the nonionic surfactant. The amount of the nonionic surfactant (b) is preferably at least 50 parts by weight, for example, from 50 to 80 parts by weight, based on 100 parts by weight of total of the nonionic surfactants (a) to (c). The weight ratio of the nonionic surfactant (a): the nonionic surfactant (b): the nonionic surfactant (c) is preferably 10 to 40:50 to 80:5 to 30, for example, 20 to 40:50 to 70:10 to 20.

[Organic Solvent]

The aqueous water- and oil-repellent dispersion of the present invention may contain or may not contain an organic solvent. Water-soluble organic solvents can be used as the organic solvent. The amount of the organic solvent may be from 0 to 200 parts by weight, for example, from 0 to 100 parts by weight, particularly from 1 to 50 parts by weight, based on 100 parts by weight of the polymer.

The dispersion according to the present invention can be prepared by emulsion-polymerizing the polymerizable compound(s) in water optionally accompanied by the organic solvent in the presence of the surfactant to give an emulsion of the polymer. Water and/or surfactant may be added to the emulsion of the polymer to give the aqueous water- and oil-repellent dispersion. The polymer concentration in the aqueous water- and oil-repellent dispersion is, for example, from 0.1 to 50% by weight.

Examples of a suitable substrate, to which the dispersion according to the present invention is applied, include a film, a fiber, a yarn, a woven fabric, a carpet, a filament made from a natural polymer material, a modified natural polymer material and a synthetic polymer material, and a product made from a fiber or a yarn. The substrate is preferably a textile which is in the form of a fiber, a yarn or a fabric.

The dispersion according to the present invention can be applied to the substrate preferably by coating, dipping, spraying, padding, roll coating, or combination of these procedures. For example, a padding bath having the bath solid content of 0.1 to 10% by weight can be used. The substrate is padded in the bath, and then excess liquid is usually removed by a squeezing roll to give the dry pickup amount (the weight of dry polymer on the substrate) of from 0.01 to 10% by weight based on the weight of the substrate. Then, the treated substrate is preferably heated at 100-200° C.

EXAMPLES

Examples and Comparative Examples are shown hereinafter to illustrate the present invention in detail.

Evaluations are conducted in Examples and Comparative Examples as follows:

Storage Stability

The average particle diameter (scattering intensity) of an aqueous dispersion (solid content: 30% by weight) is measured at the initial and after the storage at 25° C. for one month by FPAR-1000 manufactured by Otsuka Electronics Co., Ltd. and the storage stability is evaluated in the following criteria:

Good: Change rate of smaller than 10%
Fair: Change rate of 10% to 20%
Poor: Change rate of larger than 20%

Dilution Stability and Water- and Oil-Repellency (1) In the Case of Usual Treatment An aqueous dispersion is diluted with tap water to the solid content of 1.0% by weight, to prepare a treatment liquid. The state of the treatment liquid is observed after one hour, and the dilution stability is evaluated in the following criteria.

Good: No sedimentation
Fair: Slight sedimentation
Poor: Much sedimentation

After the evaluation of stability, a polyester cloth is immersed in the treatment liquid, squeezed with a mangle to give a wet pick up of 75%, dried at 100° C. for 2 minutes, and heat-treated at 160° C. for 1 minute, and then water- and oil-repellency of the treated cloth is evaluated.

Water repellency: AATCC-22 method
Oil repellency: AATCC-118 method (2) In the Case that Acrylic Binder (Anionic) is Used in Combination An aqueous dispersion is diluted with tap water to the solid content of 0.5% by weight, and an acrylic binder (ABCO Builder T-37 manufactured by ABCO) in the amount of 20.0% by weight is added to prepare a treatment liquid. The state of the treatment liquid is observed after one hour, and the dilution stability is evaluated in the following criteria.

Good: No sedimentation
Fair: Slight sedimentation
Poor: Much sedimentation

After the evaluation of stability, a polyester cloth is immersed in the treatment liquid, squeezed with a mangle to give a wet pick up of 110%, and heat-treated at 190° C. for 2 minutes, and then water- and oil-repellency of the treated cloth is evaluated.

Water repellency: AATCC-22 method
Oil repellency: AATCC-118 method (3) In the Case that a Fixing Agent (Cationic) for Cotton is Used in Combination An aqueous dispersion is diluted with tap water to the solid content of 1.0% by weight, and a fixing agent for cotton (NEOFIX RP-70 manufactured by Nicca Chemical Co., Ltd.) in the amount of 0.5% weight is added to prepare a treatment liquid. The state of the treatment liquid is observed after one hour, and the dilution stability is evaluated in the following criteria.

Good: No sedimentation
Fair: Slight sedimentation
Poor: Much sedimentation

After the evaluation of stability, a polyester cloth is immersed in the treatment liquid, squeezed with a mangle to give a wet pick up of 60%, and heat-treated at 160° C. for 1 minute, and then water- and oil-repellency of the treated cloth is evaluated.

Water repellency: AATCC-22 method
Oil repellency: AATCC-118 method

Example 1

Into a 1 L autoclave, $C_nF_{2n+1}CH_2CH_2OCOCH=CH_2$ (a mixture of compounds wherein n is 6, 8, 10, 12 and 14 (average of n: 8)) (FA) (a fluorine-containing monomer) (200 g), stearyl acrylate (20 g), N-methylolacrylamide (3 g), tripropylene glycol (50 g), pure water (400 g), nonionic surfactant 1 (6 g), nonionic surfactant 3 (16 g), nonionic surfactant 5 (4 g) were charged and emulsified by ultrasonic wave at 40° C. for 30 minutes with stirring. After the emulsification, n-dodecyl mercaptan (1 g) was added and then vinyl chloride (40 g) was injected. Further, azobisisobutylamidine dihydrochloride (0.8 g) was added and the reaction was conducted at 60° C. for 5 hours to give an aqueous water- and oil-repellent dispersion containing a polymer. The composition of the polymer was that the reaction conversion of vinyl chloride was about 80% and the reaction conversions of the other monomers were about 100%. The used nonionic surfactants are shown in Table 2.

For the aqueous water- and oil-repellent dispersion, evaluated were storage stability; water- and oil-repellency and stability of the treatment liquid in the case of usual treatment; water- and oil-repellency and stability of the treatment liquid in the case that an acrylic binder (anionic) is used in combination; water- and oil-repellency and stability of the treatment liquid in the case that a fixing agent (cationic) for cotton is used in combination. The results are shown in Table 1.

Example 2

The same procedure as in Example 1 was repeated except that the same weight amount of $C_4F_9CH_2CH_2OCOCCl=CH_2$ was used instead of FA as the fluorine-containing monomer, and the same weight amounts of compounds shown in Table 1 was used as the nonionic surfactant. The results are shown in Table 1.

Example 3

The same procedure as in Example 1 was repeated except that the same weight amount of $C_2F_5CH_2CH_2OCOCCl=CH_2$ was used instead of FA as the fluorine-containing monomer, and the same weight amounts of compounds shown in Table 1 were used as the nonionic surfactant. The results are shown in Table 1.

Example 4

The same procedure as in Example 1 was repeated except that the same weight amount of $C_4F_9CH_2CH_2OCOCH=CH_2$ was used instead of FA as the fluorine-containing monomer, and the same weight total amount of compounds shown in Table 1 were used as the nonionic surfactant. The results are shown in Table 1.

Example 5 to 7

The same procedure as in Example 1 was repeated except that the same weight amounts of compounds shown in Table 1 were used as the nonionic surfactant and additionally an ionic surfactant (1.3 g in Example 5, 0.5 g in Example 6, and 2.6 g in Example 7) shown in Table 3 was also used. The results are shown in Table 1.

Comparative Example 1 to 3

The same procedure as in Example 1 was repeated except that only one nonionic surfactant shown in Table 1 was used and the amount thereof was 26 g. The results are shown in Table 1.

Comparative Example 4 to 6

The same procedure as in Example 1 was repeated except that two nonionic surfactants shown in Table 1 were used and the amount of each nonionic surfactant was 13 g. The results are shown in Table 1.

Comparative Example 7 to 8

The same procedure as in Example 1 was repeated except that two nonionic surfactants shown in Table 1 were used, the amount of each nonionic surfactant was 13 g and additionally an ionic surfactant (5.2 g in Comparative Example 7, and 7.8 g in Comparative Example 8) shown in Table 3 was also used. The results are shown in Table 1.

TABLE 1

| | Nonionic Surfactant | | | | | Usual Treatment | | | Use of Acrylic binder | | | Use of Fixing agent | | |
|---|---|---|---|---|---|---|---|---|---|---|---|---|---|---|
| | HLB: | | | | | Polyester fabric | | | Polyester non-woven fabric | | | Cotton fabric | | |
| | HLB: less than 12 | HLB: at least 12 and less than 17 | HLB: at least 17 | Ionic Surfactant | Storage Stability | Water repellency | Oil repellency | Stability | Water repellency | Oil repellency | Stability | Water repellency | Oil repellency | Stability |
| Ex. 1 | 1 | 3 | 5 | | Good | 5 | 6 | Good | 5 | 4 | Good | 5 | 6 | Good |
| Ex. 2 | 1 | 4 | 6 | | Good | 5 | 5 | Good | 5 | 5 | Good | 5 | 5 | Good |
| Ex. 3 | 2 | 3 | 5 | | Good | 5 | 4 | Good | 4 | 4 | Good | 4 | 4 | Good |
| Ex. 4 | 2 | 4 | 6 | | Good | 4 | 4 | Good | 3 | 3 | Good | 4 | 3 | Good |

TABLE 1-continued

| | Nonionic Surfactant | | | | | Usual Treatment | | | Use of Acrylic binder Polyester non-woven fabric | | | Use of Fixing agent Cotton fabric | | |
| | HLB: less than 12 | HLB: at least 12 and less than 17 | HLB: at least 17 | Ionic Sur-factant | Storage Sta-bility | Polyester fabric Water repellency | Oil repellency | Sta-bility | Water repellency | Oil repellency | Sta-bility | Water repellency | Oil repellency | Sta-bility |
|---|---|---|---|---|---|---|---|---|---|---|---|---|---|---|
| Ex. 5 | 1 | 3 | 5 | A(5) | Good | 5 | 6 | Good | 4 | 4 | Good | 5 | 6 | Good |
| Ex. 6 | 1 | 3 | 6 | B(2) | Good | 4 | 4 | Good | 4 | 4 | Good | 4 | 4 | Good |
| Ex. 7 | 2 | 4 | 5 | C(10) | Good | 4 | 3 | Good | 4 | 3 | Good | 3 | 3 | Good |
| Com. Ex. 1 | 1 | | | | Poor | 1 | 1 | Poor | 1 | 1 | Poor | 1 | 1 | Poor |
| Com. Ex. 2 | | 3 | | | Poor | 2 | 2 | Fair | 2 | 1 | Good | 3 | 2 | Good |
| Com. Ex. 3 | | | 5 | | Poor | 1 | 1 | Poor | 1 | 1 | Poor | 1 | 1 | Poor |
| Com. Ex. 4 | 2 | 3 | | | Fair | 4 | 3 | Fair | 5 | 4 | Good | 5 | 6 | Good |
| Com. Ex. 5 | | 4 | 6 | | Fair | 4 | 2 | Fair | 4 | 3 | Good | 5 | 5 | Good |
| Com. Ex. 6 | 2 | | 6 | | Fair | 4 | 2 | Fair | 4 | 3 | Good | 5 | 5 | Good |
| Com. Ex. 7 | 1 | 3 | | A(20) | Good | 5 | 6 | Good | 1 | 1 | Poor | 5 | 6 | Good |
| Com. Ex. 8 | | 4 | 5 | B(30) | Good | 2 | 1 | Good | 4 | 3 | Good | 1 | 1 | Poor |

TABLE 2

Nonionic surfactant

| | | HLB |
|---|---|---|
| 1 | $C_{11-14}H_{23-29}$-iso-$O(C_2H_4O)_3H$ | 8.0 |
| 2 | $C_{12}H_{25}O(C_2H_4O)_4H$ | 9.2 |
| 3 | $C_{11-14}H_{23-29}$-iso-O—$(C_3H_6O)_3(C_2H_4O)_{20}H$ | 14.0 |
| 4 | $C_{12}H_{25}O(C_2H_4O)_{20}H$ | 16.2 |
| 5 | $C_{12}H_{25}O(C_2H_4O)_{30}H$ | 17.3 |
| 6 | | 17.9 |

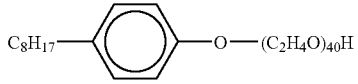

TABLE 3

Ionic surfactant

| | | Ionicity |
|---|---|---|
| A | Lauryl trimethyl ammonium chloride | Cationic |
| B | Sodium lauryl sulfate | Anionic |
| C | Lauryl dimethyl aminoacetate betaine | Amphoteric |

The invention claimed is:

1. An aqueous water- and oil-repellent dispersion comprising:
   (I) a homopolymer or copolymer comprising a unit derived from at least one polymerizable compound having a perfluoroalkyl or perfluoroalkenyl group and an acrylate, methacrylate or alpha-substituted acrylate group, and optionally a unit derived from another compound copolymerizable therewith, and
   (II) a surfactant comprising:
      (a) a nonionic surfactant having an HLB of less than 12,
      (b) a nonionic surfactant having an HLB of not less than 12 and less than 17, and
      (c) a nonionic surfactant having an HLB of not less than 17, at a weight ratio of (a):(b):(c) of (20-40):(50-70):(10-20),
   wherein the nonionic surfactant (a) comprises at least one selected from the group consisting of $C_{11-14}H_{23-29}$-iso-$O(C_2H_4O)_3H$, $C_{12}H_{25}O(C_2H_4O)_4H$, and sorbitan monopalmitate.

2. The aqueous water- and oil-repellent dispersion according to claim 1, wherein the nonionic surfactants (a), (b) and (c) are present at an emulsion polymerization.

3. The aqueous water- and oil-repellent dispersion according to claim 1, which comprises at most 15 parts by weight, based on 100 parts by weight of total of the nonionic surfactants, of a cationic surfactant, an anionic surfactant or an amphoteric surfactant as another surfactant.

4. The aqueous water- and oil-repellent dispersion according to claim 1, which does not contain another surfactant and contains only the nonionic surfactants (a), (b) and (c).

5. The aqueous water- and oil-repellent dispersion according to claim 1, wherein the amount of the nonionic surfactant (b) is at least 50% by weight, based on total of the nonionic surfactants (a), (b) and (c).

6. A textile to which the aqueous dispersion according to claim 1 is applied.

7. A method of processing a textile using the aqueous dispersion according to claim 1, comprising:
   applying the aqueous dispersion to the textile,
   removing excess liquid from the textile, and
   heating the textile.

* * * * *